Nov. 10, 1959  H. H. LOGAN  2,912,224
HOIST CONTROL MECHANISM
Filed June 10, 1954  5 Sheets-Sheet 1
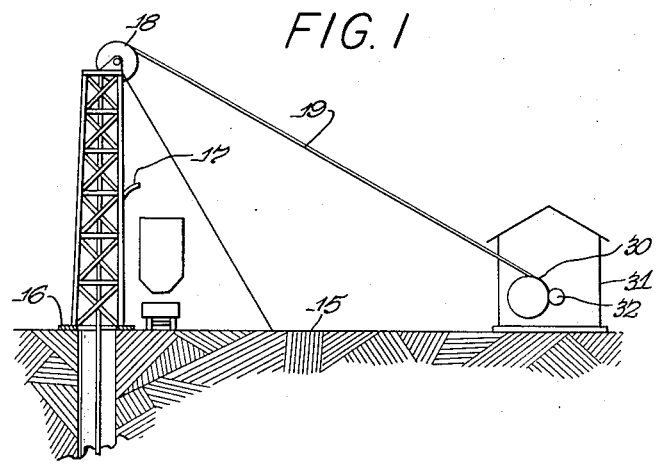
FIG. 1
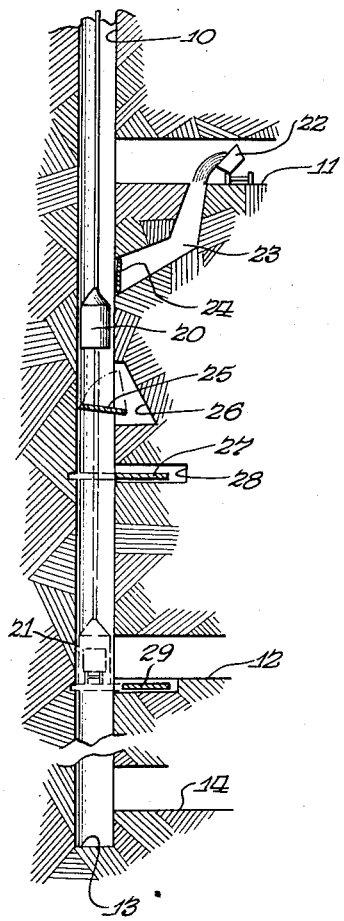
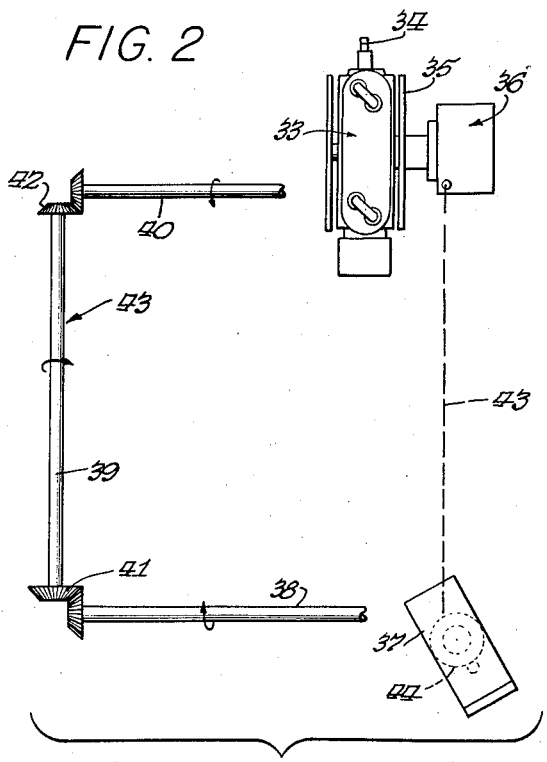
FIG. 2
INVENTOR
HENRY H. LOGAN
BY
ATTORNEY Nov. 10, 1959  H. H. LOGAN  2,912,224
HOIST CONTROL MECHANISM
Filed June 10, 1954  5 Sheets-Sheet 3

INVENTOR
HENRY H. LOGAN
BY *P. Thrall Brewer*
ATTORNEY

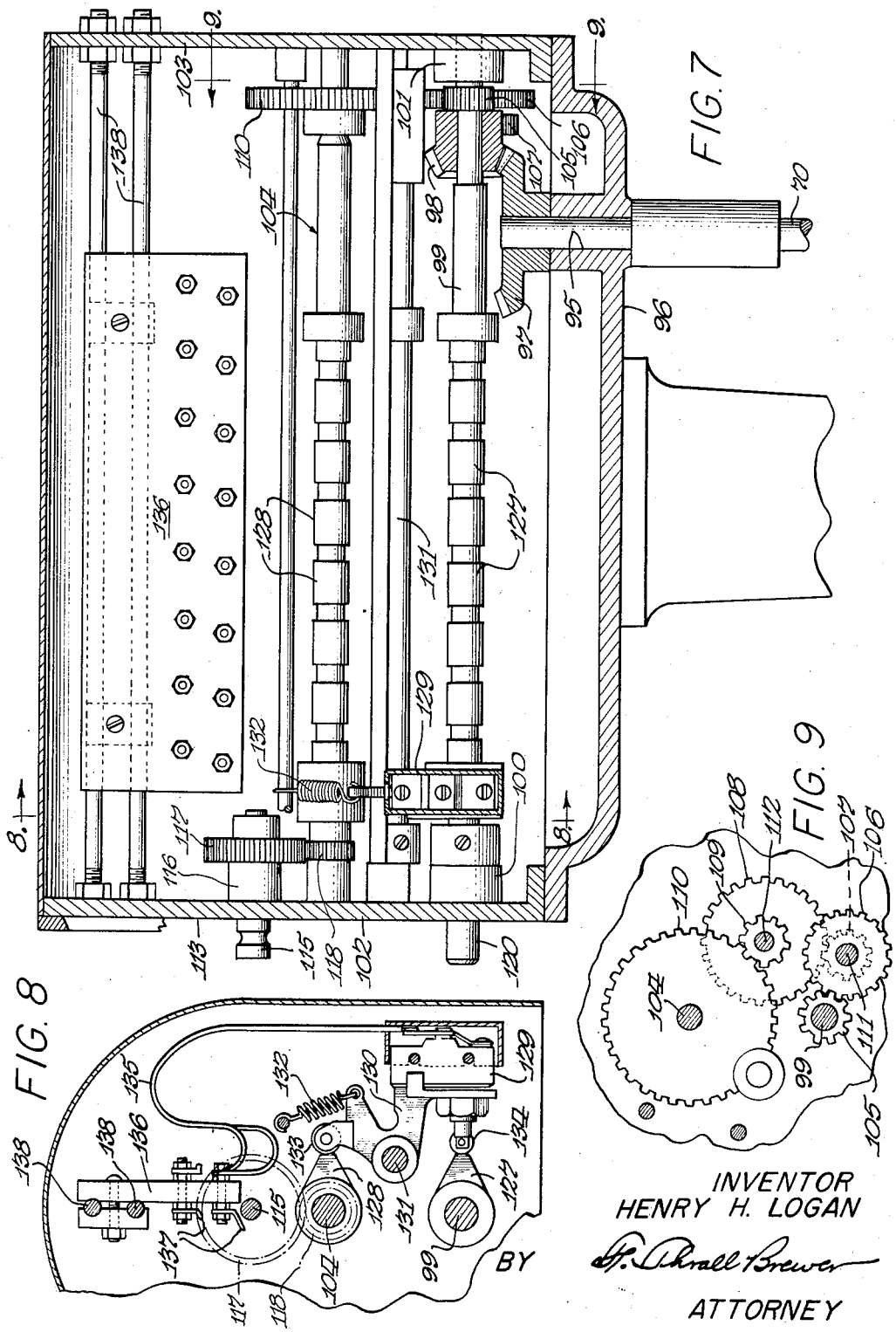

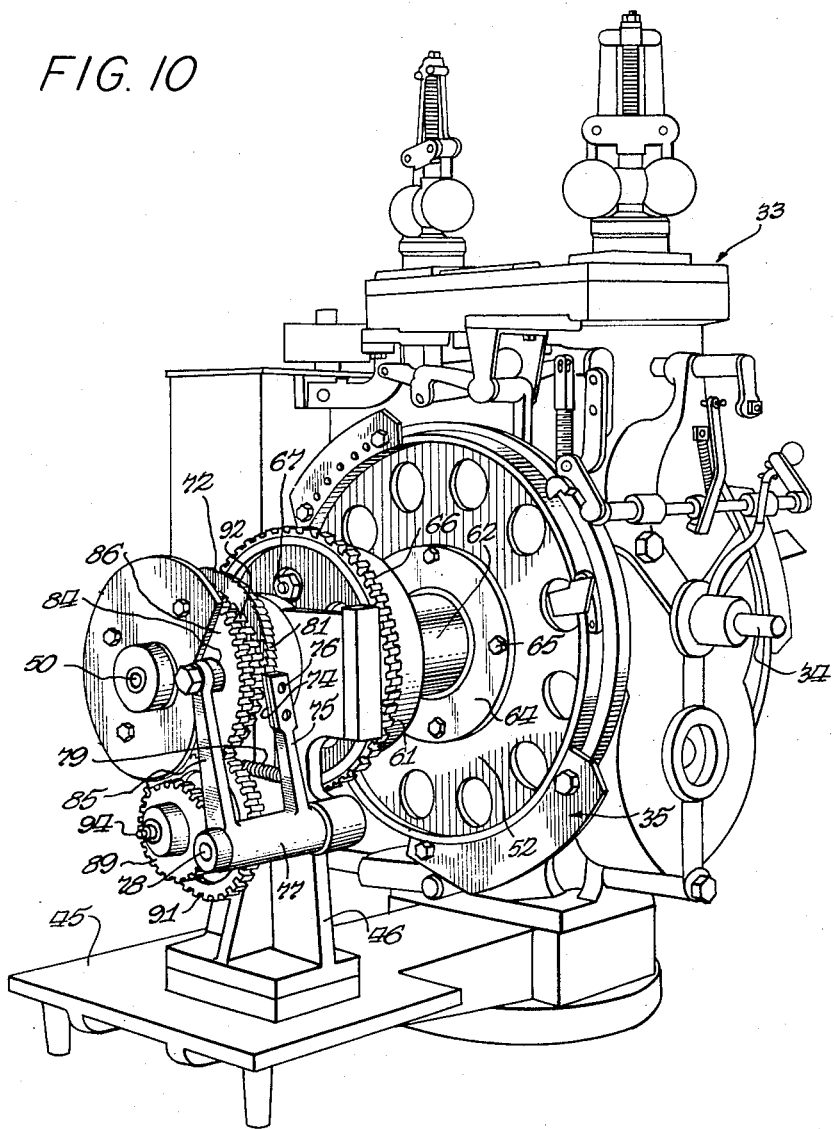

United States Patent Office 2,912,224
Patented Nov. 10, 1959

2,912,224

HOIST CONTROL MECHANISM

Henry H. Logan, Chicago, Ill.

Application June 10, 1954, Serial No. 435,837

11 Claims. (Cl. 254—173)

This invention relates to a variable depth control for a hoist of the type used for mine shafts, elevators and the like. For purposes of illustration it will be described with reference to its application to a hoist control of the type described in W. J. Lilly et al. Reissue Patent No. 17,374, dated July 16, 1929, but it is understood that the invention is applicable to other controls as well.

The aforementioned Lilly hoist control is designed to perform several functions of an automatic nature, one of which is to arrest the rotation of a hoist drum when the skip or cage controlled by the hoist reaches a predetermined level in a mine shaft. This automatic function takes the control of the hoist movement away from the operator in the event the operator, either through incapacity or carelessness, allows the hoist to continue to move in such manner that the skip or cage would strike at full speed at the bottom (or top) of the shaft in which it is moving, thereby wrecking the skip or cage and possibly injuring or even killing the occupants thereof. The depth of a shaft may remain fixed for quite some time and hence the safety device which automatically prevents the skip or cage for that shaft from striking the bottom of the shaft may be set once and then left in that setting, except possibly for any changes which might be necessitated by stretch in a new hoist cable.

There may be several levels at which mining operations are being carried on, and it may be necessary to interpose into the mine shaft, and consequently into the path of the skip, various devices such as spill chutes, knees, or the like. These devices are swung under the skip to catch material which may drop past the skip and into the bottom of the shaft unless caught and removed. With a spill chute extending into the shaft, the operator of the hoist must stop the hoist before the ore skip strikes the chute. The Lilly automatic stopping device for the hoist, however, is not effective to stop the hoist when the ore skip or mine cage is at a point other than the bottom or the top of the shaft, and hence it is possible, either through carelessness or incapacity of the hoist operator, to cause a mine cage or ore skip to crash into a spill chute and cause considerable damage to equipment, and injury or death to the occupants of the mine cage.

It is an object of this invention to provide a safety device for a hoist control or the like which will enable the hoist operator to cause the ore skip or mine cage to stop automatically at any desired point in the shaft.

Another object of this invention is the provision of a selector device to be used in conjunction with a mine hoist equipped with a variable depth control of the type herein described which will provide a remote control for the variable depth control, so that the position of the operator may be more or less independent of the location of the hoist proper.

Yet another object of this invention is the provision of a selector device for a variable depth hoist control which will indicate the position at which the variable depth control is set to stop the hoist automatically.

As a specific object this invention seeks to provide a variable depth control for a hoist control of the type disclosed in Lilly et al. Reissue Patent No. 17,374, dated July 16, 1929.

The Lilly et al. hoist control includes plate cams rotatable in timed relation to the movement of a skip or cage, the followers of which function to operate certain signals and alarms and to stop the hoist if the signals and alarms are not heeded. The cams and followers are so arranged that the hoist will be stopped when the followers are on the rise of the cams if the speed is beyond the safe limit at any point. The relative angular disposition of the cams and the hoisting drum for the skip or cage determines the level in the shaft at which the skip or cage will be automatically stopped.

It is a specific object of this invention to provide a variable depth control for a hoist control such as that disclosed by Lilly et al. and which will function to alter the phase relation between the cams of the Lilly control and the hoisting drum controlled thereby, thus altering the level at which a skip or cage will be automatically stopped by the Lilly control.

Inasmuch as rotation of the cams of the Lilly control relative to their followers should not traverse beyond the point at which the hoist is stopped, it is a further specific object of this invention to provide means for preventing an inadvertent setting of a variable depth control of a hoist for a point above the point at which a skip or cage may have been stopped.

This invention has among its more general objects the provision of a dependable means for controlling the depth at which a skip or cage can be stopped in a mine shaft by a control of the Lilly type, the provision of such depth control which is readily adaptable to existing equipment, which is rugged in construction, which may be readily and quickly adjusted to a new setting, and which is capable of producing visual or audible indications of the depths for which it is set.

These and other objects of this invention will become apparent from the following detailed description thereof when taken together with the accompanying drawings in which:

Fig. 1 is a diagram showing a vertical section through a mine shaft and the general arrangement of the hoist, ore skip and chutes which may be used in such shaft;

Fig. 2 is a schematic plan view of a hoist control to which the variable depth control of this invention has been applied, together with a selector disposed at a location somewhat remote from the hoist control and connected thereto by appropriate shafts and gears;

Fig. 3a is a fragmentary side elevational view of the control of Fig. 3 taken substantially along line 3a—3a thereof;

Fig. 7 is an enlarged side view in section of the selector of Fig. 5, showing the interior thereof;

Fig. 8 is a fragmentary front view, in section, of the selector of Fig. 7 taken along line 8—8 thereof;

Fig. 9 is a diagrammatic representation of certain gears used in the selector of Fig. 7, the view being taken along line 9—9 of Fig. 7 and looking toward the left of that figure; and Fig. 10 is a rear view in perspective of the variable depth control as applied to a Lilly hoist control.

Figure 3:
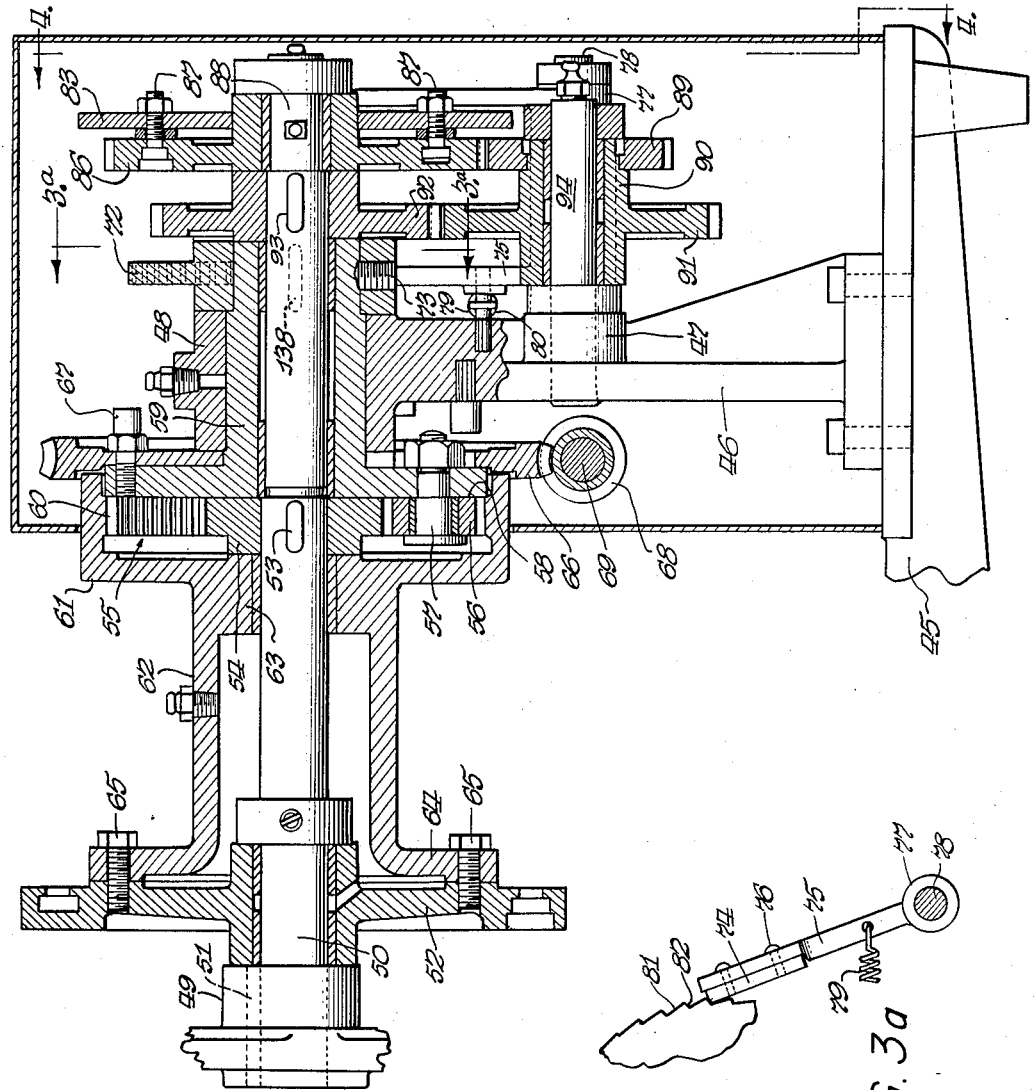
Fig. 3 is a vertical section through a variable depth control for a mine hoist control made in accordance with this invention.

For a better understanding of this invention, it is believed desirable to describe a typical mine and the operation of the devices used therein which provide the background for this invention. Referring to Fig. 1, there is shown a mine shaft 10 which may be dug vertically into the earth, and has a number of levels, such as 11 and 12, extending laterally therefrom and connecting with the ore or coal face being mined. At the bottom of shaft 10 is a sump 13, and just above the sump is a horizontally extending opening 14 generally referred to as a bottom landing. At the surface 15 of the mine there is a shaft collar 16 which surrounds the shaft and upon which is mounted an ore dump structure 17. At the upper end of the ore dump 17 is a pulley structure 18 over which passes a cable 19 for hoisting or lowering an ore skip 20 or cage 21. It is understood that a separate cable is used for the skip and cage, although both are shown in the same compartment for illustrative purposes, or both may be interchangeable.

It is the general practice, in handling materials taken from the mine face, to haul it in dump cars 22 to an inclined loading pocket 23 extending downwardly and forwardly from the floor of level 11 toward the side of shaft 10. The loading pocket opens into shaft 10, the opening being normally closed by a swinging door 24, generally referred to as a loading chute. As long as door 24 is closed (as shown) the loading pocket provides a storage space for the mined material, from which it may be subsequently removed by gravity and dumped into the ore skip 20.

In removing material from the loading pocket, loading chute 24 is swung out of the way and the material is simply dumped into the ore skip. Due to clearance which must necessarily be maintained between the skip and the sides of shaft 10, some material may fall between the skip and the shaft walls to the sump where it would be difficult to remove and might create an undesirable accumulation which would interfere with subsequent mining operations. To avoid such spill around ore skip 20, a spill chute such as 25 is placed below ore skip 20, which chute 25 is preferably in the form of a platform pivoted in a niche 26 in the side of shaft 10. It may also comprise a laterally slidable platform 27 which may be withdrawn into a pocket 28 in the side of shaft 10 when not in use.

Another form of obstruction which is usable in shaft 10 may comprise a platform or knee 29 which is slidable at floor level into shaft 10 to support or steady a cage 21 while it is being loaded.

Cable 19 is wound onto or unwound from a drum 30 in a hoist control house 31 and driven by a suitable engine 32. The direction of rotation of the drum, and the number of revolutions of the drum, control the position of the skip or cage in shaft 10. The hoist operator is provided with suitable engine controlling means (not shown) to control the application of power to rotate the hoist drum 30, and with suitable brake means to stop the rotation of the drum and thus to stop and hold the skip or cage at any desired level in shaft 10. To direct the operator to stop the drum at the proper point, certain manually operated signals as well as visual and audible signals are provided, the latter operated by a safety controller which is driven in timed relation to the rotation of the drum and signalling when the skip or cage is approaching its destination. In addition to the signals, the safety controller also operates certain controls which automatically slow down and stop the motor and the drum when the skip or hoist reaches either the bottom or the top of the shaft in the event that the hoistman fails to stop the hoist in the usual way. The latter automatic controls take the control of the hoist away from the operator in the event of his failure to heed the signals or of his sudden incapacity, due to illness, accident or neglect, to operate the controls, and hence are very desirable safety controls for the hoist.

The use of chutes 25 or 27 in a shaft have the effect of changing the location of the bottom of the shaft relative to the skip or cage since it becomes necessary to stop the skip or cage before it strikes a chute extending into the shaft. The automatic controls, however, are effective only at the actual top and bottom of the shaft except in a case of over-speeding, whereupon they become effective at any point. The hoist control of this invention, as hereinafter described, provides in effect an adjustable automatic bottom stop which the operator can set for whatever level he desires, thereby to be assured that the skip or cage will not be dropped at full speed upon a projecting chute or other object.

Referring to Fig. 2, there is shown schematically in plan view a hoist control 33 of the type shown in the aforementioned Lilly et al. Reissue Patent No. 17,374, said control being connected to the hoist drum 30 by a shaft 34 which is rotated in timed relation with the movement of the hoist drum, so that the angular position of a plate cam 35 driven from shaft 34 is representative of the position of a skip or cage in shaft 10. The variable depth control of this invention is shown at 36, the control being adjusted by a selector 37 connected to control 36 by appropriate shafts 38, 39, 40 and gears 41, 42 shown schematically and collectively in Fig. 2 as a dotted line 43. The selector is preferably disposed upon a pedestal 44 (Fig. 5) within reach of the operator, so that the actual control mechanisms 33 and 36 may be located away from the operator and at the optimum positions relative to the hoist drum from which they are driven. It is understood that the relative location of selector 37 and the variable depth control 36 may be varied to suit the requirements of individual mines.

The variable depth control will be described herein as applied to the plate cam 35 which controls only the downward movement of the skip or cage. It is understood that the upward movement of the skip or cage is controlled by a similar plate cam, but rotated in the opposite direction from plate cam 35 and that the variable depth control of this invention may be applied with equal facility to the upward control cam of the hoist mechanism.

The details of the variable depth control 36 are shown in Fig. 3. The control is mounted on a bracket 45 which extends outwardly from the base of the controller 33, so that both the controller and the variable depth control are mounted on the same member and bear a fixed relation to one another. A frame member 46 is secured to bracket 45 and extends vertically above the bracket to provide a boss 47 and a bearing 48 disposed one above the other for the support of certain elements hereinafter to be described.

A hub 49 of an element of the controller 33 which is rotated in timed relation to shaft 34 (and with hoist drum 30) is secured to a shaft 50 by a key 51 to compel shaft 50 to rotate with hub 49, and therefore to rotate likewise in timed relationship to shaft 34. Threaded over the shaft 50 is the hub 52 of cam 35.

In the form described in the aforesaid Lilly et al. reissue patent, the cam 35 is rigidly secured to the shaft 50, so that the angular relation of the cam with reference to the shaft 50 is fixed, except possibly for a slight adjustment of the cam relative to its supporting hub 52. This fixed relationship causes the safety devices operated by the cams associated with hub 52 to come into play at a predetermined skip or cage location in the shaft, said location being, as stated above, either the bottom or the top of the shaft. The apparatus constituting the variable depth control of this invention does away with the fixed angular relationship between the hub 52 and shaft 50 and substitutes for it a means for changing this angular relationship in order to change the phase relation between the cam and hoisting drum and thus changes the point at which the cam becomes effective relative to the position of the skip or cage in a shaft. Furthermore, the selector mechanism associated with the variable depth control provides a means for manually setting the depth control to any given depth in the shaft, so that the movement of the skip or cage will be automatically controlled at a point, or points, other than the bottom and the top of the shaft, as in the prior Lilly control.

Thus, in Fig. 3, the shaft 50 extends to the right and is provided with a key 53 for driving a sun gear 54 of a planetary gear set designated in its entirety by reference character 55. The sun gear 54 is mounted on shaft 50 so as to be centered thereon as well as driven thereby. A planet gear 56 is supported for rotation about individual pin 57 secured to a planet carrier 58, the latter being in the form of a flange formed on the left hand end of a sleeve 59 journalled in the bearing 48.

Planet gears 56, in turn, mesh with an internally toothed ring gear 60 constituting the third member of the planetary gear set. Said ring gear 60 is formed on the interior of a drum 61, preferably formed integrally with a sleeve housing 62, journalled at one end 63 on shaft 50 and provided at the left-hand end, as viewed in Fig. 3, with a radially extending attaching flange 64 by which it is secured, through bolts 65, to the cam hub 52. Ring gear 60 therefore is constrained to move with hub 52 and with the cams attached thereto, while sun gear 54 is constrained to move with shaft 50 in timed relation with the movement of the skip or cage. The angular relationship between the sun and ring gears 50 and 60 respectively, and consequently between shaft 50 and cam hub 52, is determined by planet pinions 56.

The carrier 58 for the planet pinions is normally fixed, so that said pinions serve to drive hub 52 from shaft 50, incidentally providing a speed reduction between those oppositely rotating elements. By providing an angular adjustment of the carrier 58 relative to the frame 46 of the variable depth control, the position of the cam hub 52 relative to the shaft 50 can be altered so that for a given skip or cage position in the mine shaft, the cam devices supported by the hub 52 can be made effective to arrest the movement of the skip or cage at that position or at a different position. Thus, the effective "bottom" of the shaft, in so far as the control mechanism is concerned, can be raised or lowered merely by angularly adjusting the carrier 58 relative to frame 46.

The means for effecting an angular adjustment by carrier 58 constitutes a worm gear 66 which is secured by bolts 67 to carrier 58, so as to be rotatable therewith. Worm gear 66 engages a worm 68 secured to a shaft 69, the axis of which is disposed transversely to the axis of the shaft 50. For illustrative purposes, the shaft 69 is shown in Fig. 3 as being disposed below the shaft 50, but its actual location is preferably behind worm gear 66 so that the axis of said shaft 69 is disposed vertically of the control mechanism, as shown more clearly in Fig. 4. The shaft 69 may then be connected to, or be an extension of, shaft 40, and shaft 40, gear 42, shaft 39, gear 41 and shaft 38 serve to connect shaft 69 to the shaft 70 by the selector 37 (Fig. 5). Shaft 70 is then connected through gearing, hereinafter to be described, to a hand wheel 71, shown in Figs. 5 and 6, so that the angular position of carrier 58 may be manually adjusted by the hoist operator through suitable manipulations of hand wheel 71 at selector 37.

As described in detail in the aforementioned Lilly reissue patent, the rollers and cams which control the movement of the skip or cage are such that the rollers may ride up on the cams, and when so positioned, the skip or cage will be stopped automatically, thereby preventing the cams from continuing along the rollers and having the rollers dropping off the cams at the back end thereof. With the mechanism thus far described, however, it is possible for an operator while a hoist is at rest to set the worm wheel and the associated ring gear 60 and cam hub 52 to stop the skip or cage at a location above that at which it may then be standing. Such rotation of the cam causes the rollers to drop off the cams at the back thereof, which would put the control mechanism out of synchronism, and hence the cams would be thrown out of phase with respect to the hoist. Under these conditions, instead of the cam rotating ninety degrees, for example, before the rollers ride up on their respective cams, the cams may have to rotate through 270 degrees before the rollers ride up on their cams which, in terms of skip or cage location, would mean that the skip or cage could not be automatically controlled at all, but might strike the bottom of the shaft at full speed. It is necessary, therefore, to provide means on the variable depth control for preventing inadvertent adjustment of the cams relative to skip or cage location in such a manner that the cams will be out of phase with the hoist movements.

The means for preventing an inadvertent setting of the control above a given cage position comprises essentially a stepped cam 72 secured to sleeve 59 by a key 138 and set screw 73 so that cam 72 and worm wheel 66 are constrained to move together. Cooperating with stepped cam 72 is a pawl 74 which is shown to better advantage in Fig. 3a, the pawl being secured to an arm 75 by machine screws 76. Arm 75 may be formed as an integral part of a sleeve 77 rotatably mounted on a shaft 78 which is rigidly supported in frame 46 with its axis parallel with the axis of shaft 50. A tension spring 79 (Fig. 4), having one end secured to arm 75 and its other end secured to a fixed point 80 on frame 46, continuously urges arm 75 in a counterclockwise direction toward stepped cam 72 so as to cause pawl 74 to engage the stepped periphery of cam 72.

Teeth 81 of cam 72 are so arranged that radial portions 82 thereof face the end of pawl 74. Furthermore, the arrangement of the teeth 81 is such that cam 72 will rotate clockwise, as viewed in Fig. 4, as the cage or skip descends into the mine shaft. Thus, it may be apparent that when pawl 74 abuts on the radial portion 82 of a tooth, further rotation of cam 72 and its associated worm gear 66 in a clockwise direction is impossible. Hence, just as soon as a tooth engages the pawl, the highermost setting for the variable depth control is established and it is physically impossible for the operator to set the depth control for a higher setting inadvertently or otherwise. To complete the mechanism, means are provided for relating the radial position of pawl 74 to the position of a skip or cage, so that wherever the cage or skip may be, a corresponding location of pawl 74 will be established to prevent rotation of stepped cam 72 beyond such skip position.

The means for relating the pawl position to the skip or cage position comprises a cam 83 (Figs. 3, 4 and 10) and a roller follower 84, the follower being rotatably mounted on the end of an arm 85 extending outwardly from and integral with sleeve 77. Cam 83 is secured to the side of a gear 86 by suitable bolts 87, gear 86 being mounted on, and free to rotate about, a reduced end portion 88 of shaft 50. Gear 86 meshes with a smaller gear 89 of a gear cluster 90, a large gear 91 of said cluster meshing, in turn, with a gear 92 keyed at 93 to the shaft 50. The gear reduction established between gears 92 and 86 is substantially the same as that established between sun gear 54 and ring gear 60 of the planetary gear set 55 so that the cam 83 will rotate at the same angular velocity as cam hub 52, although in the opposite direction. Gear cluster 90 is mounted for free rotation on a stub shaft 94 supported in boss 47.

Figure 4:
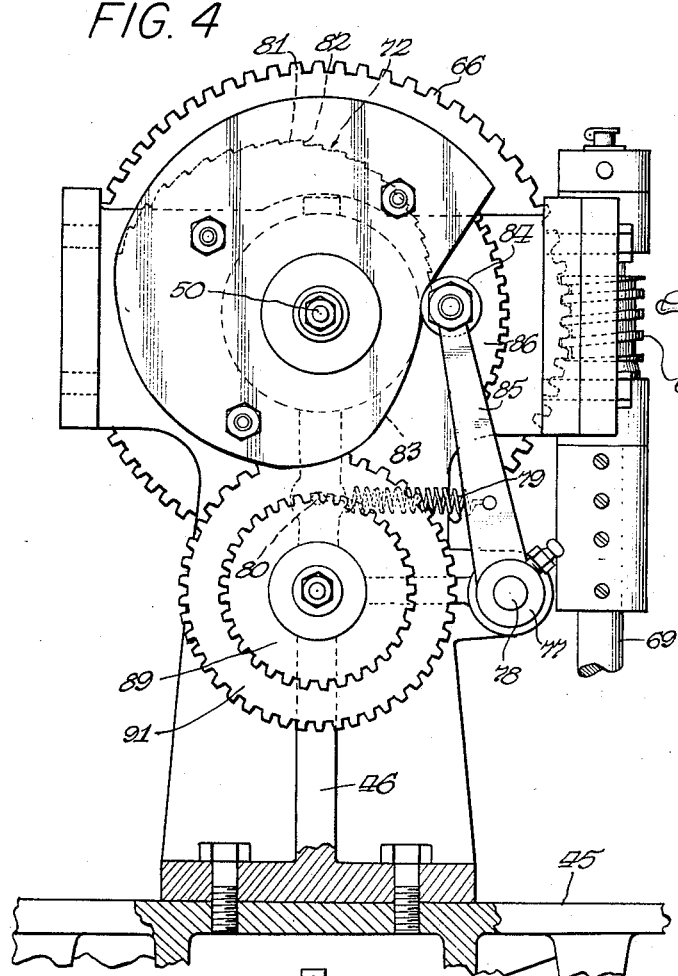
Fig. 4 is a side elevational view of the control of Fig. 3 with the cover removed, the view being taken along line 4—4 of that figure.
Figure 5:
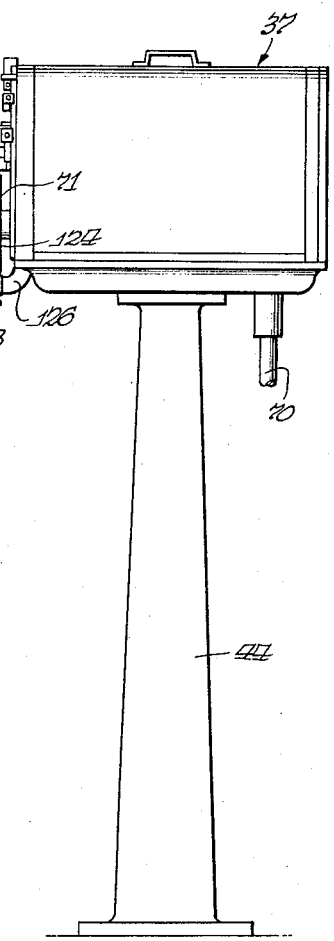
Fig. 5 is a side elevational view of a pedestal and a depth selector mounted thereon.

It may thus be apparent that as cam 83 rotates in a counterclockwise direction as viewed in Fig. 4, roller 84 will be moved radially outwardly and will carry pawl 74 with it through arm 85, sleeve 77 and arm 75. Assuming that cam 83 has been correctly profiled so that the position of roller 84 on cam 83 causes pawl 74 to contact a tooth 81 when cam hub 52 is at the correct angular location to stop the hoist through the associated cam 35, an inadvertent rotation of worm wheel 66 for a point above the point at which the hoist is stopped is impossible. The correct profiling of cam 83 will insure this result for any desired location of the skip or cage in the shaft.

The unit for correctly positioning the worm wheel of the variable depth control in relation to the position of the skip or cage is termed herein a selector. It is composed principally of a combination of shafts, gears, electric switches, and indicating means to show the positions for which the equipment may be set at any given time, the unit, as mentioned previously, being conveniently mounted on a pedestal 44 within easy reach of the hoist operator.

Referring now to Figs. 7, 8 and 9, it may be observed that shaft 70, which, as previously described, has a geared connection to shaft 69 for worm 68, enters the selector through a bearing 95 located in a bottom wall 96 of the selector. On the end of shaft 70 is mounted a larger gear 97 of a pair of meshing mitre gears, a smaller gear 98 of which is secured for rotation with a longitudinally extending cam shaft 99. Said shaft 99 is journalled in bosses 100 and 101 disposed on inner faces of front and rear end plates 102 and 103, respectively, of selector 37. Immediately above cam shaft 99 is a second cam shaft 104, the axis of which is substantially parallel to the axis of shaft 99, and which is also journalled in end plates 102 and 103. Shaft 104 is driven from shaft 99 through reduction gearing shown diagrammatically in Fig. 9, and comprising gears 105 to 110 inclusive, gear 105 being mounted on shaft 99 and rotatable therewith and gear 110 being mounted on the shaft 104 and arranged to transmit a drive thereto. Gears 106 and 107 comprise a cluster mounted on a countershaft 111 and, similarly, gears 108 and 109 comprise a gear cluster mounted on a second countershaft 112. Due to the serial connection of the gearing and the presence of two countershafts, the direction of rotation of shaft 104 is counter to that of shaft 99, and the reduction in speed established by the relative sizes of the gears and clusters is such that shaft 104 will be driven from shaft 105 at one-twentieth of the speed of the latter.

Figure 6:
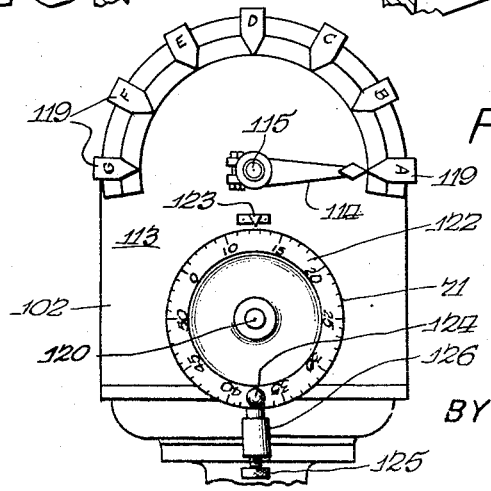
Fig. 6 is an enlarged front elevational view of the selector of Fig. 5.

The specific point in the mine shaft for which the control is set to stop a skip or cage is indicated on the front surface 113 of end plate 102 (Figs. 6 and 8). A pointer 114 is secured to the outer end of a shaft 115 rotatably mounted in a bearing boss 116 on the interior surface of the end plate 102. The shaft 115 has mounted thereon a gear 117 which is secured thereto so as to be rotatable at all times with shaft 115. Gear 117 meshes with a pinion gear 118 mounted for rotation with cam shaft 104. The ratio between the numbers of teeth on gears 117 and 118 is such that gear 118 will rotate twice as fast as gear 117.

The outer surface 113 of end plate 112 constitutes a dial over which the pointer 114 may sweep, said dial being arranged with suitable indicia 119 adapted to be aligned with the end of pointer 114, said indicia being marked to indicate different depths in the mine shaft.

The left-hand end of the cam shaft 99, as viewed in Fig. 7, extends through bearing boss 100 to the exterior of the selector and has mounted on the end 120 thereof the aforementioned hand wheel 71, shown in Figs. 5 and 6. Said hand wheel is provided with an annular scale 122 at the outer periphery thereof, the scale being adapted to pass in proximity to a fixed arrow or pointer 123 mounted on the outer face 113 of end plate 102. A handle 124 constitutes a convenient means by which hand wheel 71 and its associated shaft 120 may be rotated. Wheel 71 may be locked in any given position by a knurled headed screw 125 disposed in a bracket 126 depending from the bottom wall 96 of the selector, said thumb screw 125 being arranged to cooperate with the periphery of the hand wheel in a radial direction and therefore being substantially clear of handle 124.

By spacing indicia 119 apart an angular distance which is an even multiple of the revolutions of hand wheel 71, said hand wheel may be graduated in feet and the indicia may be graduated in the said multiples of the maximum number of feet indicated on scale 122.

It may be necessary to indicate visually, by lighted signals at various points throughout the mine, the lowermost level for which selector 37 is set. The means for accomplishing this result comprises a plurality of cams 127 (Figs. 7 and 8) on shaft 99 and a similar number of cams 128 on shaft 104, both sets of cams cooperating with means for actuating an electrical microswitch 129 mounted on a bracket 130 which is pivoted on a rod 131 extending longitudinally of selector 37 in parallel relationship to cam shafts 99 and 104. Said bracket 130 is continuously urged in a counterclockwise direction (Fig. 8) by a tension spring 132. Bracket 130 has mounted in the upper region thereof a roller 133 which rides on the surface of cam 128. Switch 129 has a roller 134 which is adapted to be contacted by cam 127 when the rise of cam 128 and the rise of cam 127 simultaneously engage their respective rollers. The disposition of the rollers 134 and 133 relative to the cams 127 and 128 is such that roller 134 is urged to the right by cam 127 when the rise of cam 128 contacts roller 133 at its peak. This movement to the right of roller 134 is utilized to close a pair of contacts in switch 129, and thereby to energize a lamp circuit 137 through suitable flexible leads 135 and a terminal board 136. For convenience, terminal board 136 may be clamped to a pair of rods 138 which pass longitudinally through selector 37 and are fixed to end plates 102 and 103.

It is understood that there are as many pairs of cams 127 and 128 affixed to cam shafts 99 and 104 as there are visual signals to be operated by the selector. For simplicity, however, but one such pair of cams and associated switch operating mechanism has been shown and described herein. It may be apparent that by spacing each pair of cams angularly relative to the other pairs of cams, no two pairs will operate a switch at the same time and hence each visual signal may be operated successively as the selector is set for successively higher or lower levels.

It has been stated previously that selector 37 cannot be set for a skip or cage stop in its downward direction at a level which is higher than the level then occupied by the said skip or cage. However, once selector 37 is set for a level lower than the point where the skip or cage may be at the moment, it may not thereafter be lowered below that point, until the setting is changed. It may be recalled that cam 35 controls only the downward movement of the skip or cage. When the skip or cage is at the top of the shaft, therefore, it may be started downwardly without interference from cam 35 until it reaches the level for which said cam has been set. At any time, however, it is possible to turn hand wheel 71 somewhat in synchronism with the downward movement of the skip or cage, the hand wheel continuously indicating a selected stop which is below the actual location of the skip or cage as it descends into the shaft. By so preceding the skip or cage, the level setting for which the variable depth control of this invention was previously set may be lowered below the previously set point without causing stepped cam 72 and its associated pawl 74 to come into play. Thus, the first setting of the selector for an intermediate automatic stopping point other than the bottom of the shaft may be made with an accurate foreknowledge of the exact location of any obstruction such as a chute in the shaft below the cage or skip, but once the setting is made by the selector, all subsequent stops in a downward direction to that point will be automatic if the operator should fail to stop the hoist at the proper place.

It is understood that the foregoing description is merely illustrative of a preferred embodiment of this invention and that the scope of this invention, therefore, is not to be limited thereto, but is to be determined by the appended claims.

I claim,

1. In combination with a rotatable drum for the cable of a hoist or the like, a rotatable control for automatically stopping the rotation of the drum after a predetermined number of rotations thereof, means for driving the control in timed relation with the rotatable drum, means for imparting a rotation to the control independently of the rotation of the drum to stop the drum after a lesser number of rotations than the said predetermined number, whereby to stop the hoist at a higher elevation than when the drum is stopped after said predetermined number of rotations, and means cooperating with the means for imparting a rotation to the control independently of the rotation of the drum for preventing the independent rotation of the control beyond the position of the control corresponding to the hoist position.

2. The combination described in claim 1, the means for imparting a rotation to the control independently of the rotation of the drum comprising a sun gear rotatable in timed relation with the drum, a ring gear rotatable in timed relation with the rotatable control, a planet gear meshing with the sun and ring gears, a carrier for the planet gear, a fixed support for the carrier, and means for shifting the carrier angularly with respect to said fixed support; and the means for limiting the independent rotation of the control while the hoist is stationary comprising a ratchet rotatable with the means for shifting the carrier angularly, a pivoted pawl, and means for holding the pawl out of contact with the ratchet except when the hoist position as determined by the control and the actual hoist position coincide.

3. The combination described in claim 1, the means for imparting a rotation to the control independently of the rotation of the drum comprising a sun gear rotatable in timed relation with the drum, the ring gear rotatable in timed relation with the rotatable control, a planet gear meshing with the sun and ring gears, a carrier for the planet gear, a fixed support for the carrier, and means for shifting the carrier angularly with respect to said fixed support, and the means for limiting the independent rotation of the control while the hoist is stationary comprising a ratchet rotatable with the means for shifting the carrier angularly, a pivoted pawl, and means for holding the pawl out of contact with the ratchet except when the hoist position as determined by the control and the actual hoist position coincide, said last-mentioned means comprising a cam driven in timed relation with the rotatable control for automatically stopping the rotation of the drum, a follower cooperating with the cam, means connecting the follower to the pawl, said cam being arranged to move its follower and the associated pawl toward and away from the ratchet, and said ratchet having teeth disposed along an involute such that contact between the pawl and ratchet is determined by the conjoint movement of the ratchet about its center and the position of the pawl as determined by the cam contour.

4. A combination as described in claim 1, the means for imparting a rotation to the control independently of the rotation of the drum comprising a shaft rotatable in timed relation with the drum, a sun gear mounted for rotation with the shaft, a ring gear rotatable in timed relation with the rotatable control, a planet gear meshing with the sun and ring gears, a carrier for the planet gear, a fixed support for the carrier, and means for shifting the carrier angularly with respect to said fixed support; and the means for limiting the independent rotation of the control while the hoist is stationary including a gear mounted upon and driven by the sun gear shaft, a counter shaft, a gear on the countershaft meshing with the gear on the sun gear shaft, a second gear on the countershaft rotatable with the first said countershaft gear, a gear mounted for free rotation about said sun gear shaft and meshing with the second countershaft gear, a cam rotatable with the gear mounted for free rotation on the sun gear shaft, a follower cooperating with the cam, the means for shifting the carrier angularly with respect to said fixed support including a worm wheel rotatable with the carrier and a worm cooperating with the worm wheel adapted to rotate said worm wheel, a stepped cam rotatable with the worm wheel and a pawl movable with the cam follower adapted to engage the stepped cam to prevent rotation of the cam and its associated worm wheel and carrier in accordance with the position of the cam follower as dictated by the cam contour.

5. The combination as described in claim 1, the means for imparting a rotation to the control independently of the rotation of the drum comprising a sun gear rotatable in timed relation with the drum, a ring gear rotatable in timed relation with the rotatable control, a planet gear meshing with the sun and ring gears, a carrier for the planet gear, a fixed support for the carrier, and means for shifting the carrier angularly with respect to said fixed support, said last-mentioned means comprising a selector mechanism including a rotatable hand wheel, means for transmitting the rotation of the hand wheel to the carrier, a rotatable pointer, and means for driving the pointer from the hand wheel, said pointer driving means including speed reducing means, whereby the location of said pointer is an indication of the level in the shaft wherein the hoist will be automatically stopped.

6. A combination as described in claim 5, said selector including a pair of cam shafts having their axes disposed in parallel relation with one another and having cams spaced longitudinally of each cam shaft in cooperating pairs, the pairs of cams being differently angularly related such that no two cams will occupy the same angular relationship at the same time, means for driving the cams in timed relation to the rotation of the hand wheel, and means operated jointly by the cams of a pair of cams for energizing a visual signal.

7. A combination as described in claim 5, said selector including a pair of cam shafts having their axes disposed in parallel relation to one another and having cams spaced longitudinally of each cam shaft in cooperating pairs, the pairs of cams being differently angularly related such that no two cams bear the same angular relationship at the same time, means for driving the cams in timed relation to the rotation of the hand wheel, switch means for controlling the energization of a visual signal, a pivoted support for the switch means, a roller on the pivoted support adapted to function as a follower for one of the cams of a pair of cams, a roller on the switch means for actuating the switch means and adapted to function as a follower for the other of the said pair of cams, said rollers being so disposed relative to the pivoted support that the roller for the switch means will not be actuated to actuate the switch means until the rise of both cams simultaneously engage both of said rollers.

8. A combination as described in claim 5, a fixed support for the hand wheel and means for locking the hand wheel to the fixed support.

9. A combination as described in claim 5, the axes of rotation of the rotatable pointer being substantially parallel with the axis of the rotatable hand wheel, a stationary dial over which the pointer is adapted to pass, and indicia on said dial representing different levels for the hoist, said hand wheel having an annular scale for indicating hoist positions intermediate those indicated by said indicia.

10. In combination, a cable for a hoist or the like, a rotatable drum for storing and playing out the said cable, a rotatable control for the drum, means for driving the control in timed relation with the rotatable drum, means for altering the phase relation between the control and drum, and means operated as a function of the amount of cable played out and operable upon the phase relation altering means for preventing an alteration of the phase relation between the control and drum.

11. In combination with a rotatable drum for the cable of a hoist or the like, a rotatable control for automatically stopping the rotation of the drum after a predetermined number of rotations thereof, means for driving the control in timed relation with the rotatable drum, and means for altering the phase relation between the control and drum, said driving means comprising a constant mesh gear train having a driving gear, a driven gear and an intermediate gear meshing with the driving and driven gears, and said means for altering the phase relation, comprising means for driving the intermediate gear while one of the other gears of the train is stationary.

References Cited in the file of this patent

UNITED STATES PATENTS

| | | |
|---|---|---|
| 808,273 | Darlington | Dec. 26, 1905 |
| 1,262,594 | Akimoff | Apr. 9, 1918 |
| 1,558,955 | Welch | Oct. 27, 1925 |
| 1,808,454 | Dina | June 2, 1931 |
| 1,877,171 | Hallenbeck | Sept. 13, 1932 |
| 2,565,779 | Muddiman | Aug. 28, 1951 |
| 2,633,755 | Bommelaer | Apr. 7, 1953 |
| 2,656,027 | Crookston | Oct. 20, 1953 |
| 2,677,971 | Greenwood | May 11, 1954 |
| 2,759,494 | Honegger | Aug. 21, 1956 |

UNITED STATES PATENT OFFICE
CERTIFICATE OF CORRECTION

Patent No. 2,912,224                      November 10, 1959

Henry H. Logan

It is hereby certified that error appears in the printed specification of the above numbered patent requiring correction and that the said Letters Patent should read as corrected below.

Column 5, line 32, for the numeral "50" read -- 54 --; line 62, for "by the" read -- of the --; column 6, line 14, for "could" read -- would --; line 63, for "large" read -- larger --; column 12, after line 17, list of references cited, under UNITED STATES PATENTS, insert the following:

2,542,821 - Ljunggren et al. - Feb. 20, 1951

Signed and sealed this 3rd day of May 1960.

(SEAL)
Attest:

KARL H. AXLINE
Attesting Officer

ROBERT C. WATSON
Commissioner of Patents